Aug. 3, 1948.  F. GRAVES  2,446,367
ELECTRIC WATER HEATER
Filed Aug. 3, 1945
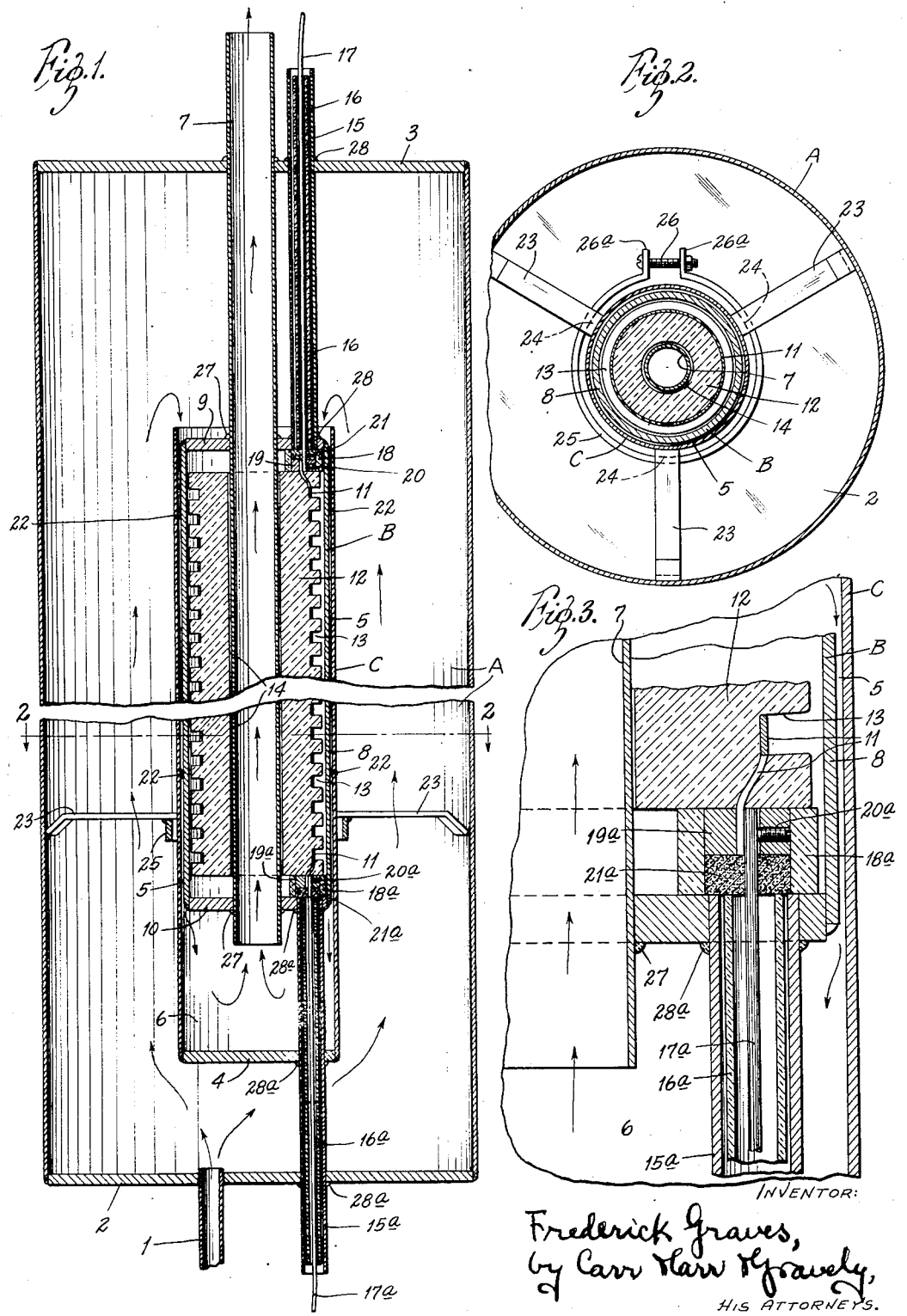
INVENTOR:
Frederick Graves,
by Carr Harr & Gravely,
HIS ATTORNEYS.

UNITED STATES PATENT OFFICE 2,446,367

ELECTRIC WATER HEATER

Frederick Graves, St. Louis, Mo.

Application August 3, 1945, Serial No. 608,776

10 Claims. (Cl. 219—39)

This invention relates to electric water heaters. The principal object of the invention is to devise a simple, economical and compact heater of the above type that can be quickly and easily embodied in a water conduit to continuously and rapidly heat the water flowing therethrough with a minimum consumption of electric current; and that will include a storage chamber for water and a refractory clay element adapted to absorb heat from the heating element during the operation of the latter and to supply radiant energy for heating the storage water for a considerable length of time after the heating element is rendered inoperative. The invention consists in the electric water heater and in the parts and combinations and arrangements of parts hereinafter described and claimed.

In the accompanying drawing, which forms part of this specification and wherein like symbols refer to like parts wherever they occur, Fig. 1 is a central vertical longitudinal section through an electric water heater embodying my invention, Fig. 2 is a horizontal cross sectional view on the line 2—2 in Fig. 1; and Fig. 3 is an enlarged fragmentary sectional view similar to Fig. 1.

My electric water heater comprises a closed upright cylindrical reservoir A, having a cold water inlet 1 in the bottom 2 thereof, and a relatively small central cylindrical electric heating unit B enclosed in said reservoir concentric therewith and spaced a considerable distance from the side, the top 3 and said bottom thereof. Surrounding the heating unit B concentric therewith and closely adjacent thereto is a cylindrical tube or shell C having a closed lower end 4 spaced below the lower end of said unit and above the bottom 3 of the reservoir A and having an open upper end extending slightly above the upper end of said central housing. Thus, the intermediate casing C cooperates with heating unit B to form therebetween a narrow annular conduit or passageway 5 which leads upwardly from the chamber 6 between the vertically spaced bottoms of the reservoir B and said unit and opens into said reservoir at the open upper end of said casing. A central vertical tubular hot water outlet conduit 7 extends upwardly through the heating unit B from the chamber 6 therebelow and through the top 3 of the reservoir B. By the arrangement described, the water enters the reservoir A through the inlet conduit 1 in the bottom 2 thereof and fills said reservoir. The water thence flows downwardly through the annular conduit 5 between the heating unit B and the cylindrical shell C into the chamber 6 in the bottom of the latter and thence flows upwardly through the central outlet conduit 7 to the discharge end thereof.

The electric heating unit B comprises a cylindrical casing 8 having top and bottom closure plates 9 and 10, respectively, through which the central outlet tube or conduit 7 extends. The heating element for said unit comprises a ribbon resistance wire 11 that is helically wound around a supporting core 12 of porcelain or other earthenware refractory material located in the casing 8. The core 12 has an external helical groove 13 in which the helically wound resistance wire 11 is seated; and the outlet tube or conduit 7 extends through an axial bore 14 provided therefor in said core. The ends of the resistance wire 11 extend through the ends of the core 12.

Extending through the tops of the reservoir A and the heating unit casing 8 is a wiring conduit 15 containing porcelain insulating tubes 16 for one lead 17 of an electric circuit for energizing the resistance coil 12; and extending upwardly through the bottoms of said reservoir and said casing and the bottom of the cylindrical shell C is a similar wiring conduit 15a containing tubular insulation 16a for the other lead 17a of said circuit. Located between the upper ends of the casing 8 and the porcelain core 12 therein is a sleeve 18 of porcelain or other insulating material which is disposed opposite the upper wiring conduit 15 in position to receive the lower end of the lead wire 17 therein. The spacing sleeve 18 has an annular wire connector 19 located therein which seats on the upper end of the core 12 and is adapted to receive in overlapped relation the lower end of the wire 17 and the upper end of the resistant wire coil 11, the overlapped ends of these wires being clamped together by means of a set screw 20 carried by said annular wire connector. An insulating washer 21 snugly fits within the spacing sleeve 18 and around the lead wire 17 therein and seats on the upper end of the annular wire connector 20. Similar means is provided for electrically connecting the other lead wire 17a to the lower end of the resistance coil 11, said means comprising a porcelain spacing sleeve 18a, an annular wire connector 19a provided with a locking screw 20a and an insulating washer 21a.

As shown in the drawing, the tubular shell C has lateral projections 22 on the inner side thereof that bear against the heating unit B and thus serve to maintain the annular passageway 5 therebetween. The shell C and heating unit are also held against joint sidewise movement in the reservoir A by means of a plurality of radially disposed struts 23 that bear at their outer ends against the side of said reservoir and have downwardly bent inner ends 24 that are clamped against the side of said heating unit by means of a split clamping ring 25 which surrounds said inner ends of said struts and is clamped thereto by means of a stove bolt 26 which engages the ends 26a of said ring. The water outlet conduit is secured to top and bottom of the casing 8 of the heating unit B by annular welds 27; the wiring conduit 15 is secured to the tops of the reservoir A and heater unit casing 8 by similar welds 28; and similar welds 28a secure the widing conduit 15a in the alined openings provided therefor in the bottoms of the casing 8, casing C and reservoir A. These welds provide water-proof joints between the parts connected thereby and they also maintain the parts in proper spaced relation.

When the electric heater unit B is turned on and the water is flowing therethrough in the manner hereinbefore described, the refractory core 12 is heated to a high degree by the resistance wire 11 helically coiled there around and the heat is transmitted through the watertight coil and core enclosing casing 8 to the thin annular stream of water flowing downwardly through the narrow annular conduit 5 between the spaced sides of the heater unit casing 8 and the intermediate casing C into the chamber 6. The water thence flows upwardly from the chamber 6 through the central outlet conduit 7 where it is again heated by the heated refractory coil supporting core 12. Thus, the flowing water is continuously and rapidly heated during its passage through the electric heater. During the operation of the heater, the earthenware refractory core 12 is heated to incandescence by the heating coil 11 and, after the heater is turned off, this extremely hot core continues to give off heat in the form of radiant energy which serves to keep the water in the storage chamber at a fairly high temperature for several hours. If within this period of time, the heater is again turned on, an initial supply of hot water is provided until the heater again becomes effective to heat the flowing water. The intermediate casing C, the housing for the heater unit B, and the outlet tube 7 are all made of aluminum or other material of high heat conductive and corrosion resisting qualities.

Obviously, the hereinbefore described electric water heater admits of considerable modification without departing from the invention. Therefore, I do not wish to be limited to the precise arrangements shown and described.

What I claim is:

1. An electric water heater comprising a reservoir having an inlet at the end thereof, a tubular casing located in said reservoir and spaced from the side and both ends thereof, said tubular casing being closed at its lower end and open at its upper end, an electric heating unit located in said tubular casing and spaced therefrom to form a chamber at the closed lower end thereof and a passageway leading from said chamber and opening into said reservoir at said open upper end of said casing, and a central outlet tube passing through said electric heating unit and opening at its lower end into said chamber and extending exteriorly of said reservoir at the upper end thereof.

2. The combination set forth in claim 1 wherein said heating unit includes a refractory non-metallic heat absorbing core having an axial opening through which said outlet tube extends, and an electric resistance element mounted on said core.

3. The combination set forth in claim 1 wherein said heating unit includes a metallic casing, a core of refractory non-metallic heat absorbing and radiating material enclosed in said metallic casing and having an axial opening through which said outlet tube extends, and an electric resistance coil wound around said core.

4. The combination set forth in claim 1 wherein said heating unit includes a refractory heat absorbing and radiating clay core having an external helical groove and an axial opening through which said outlet tube extends and a helically coiled ribbon resistance wire seating in said helical groove of said core.

5. The combination set forth in claim 1 wherein said heating unit includes a core having an axial opening through which said outlet tube extends, an electric resistance coil mounted on said core, a wiring conduit extending through said lower end of said reservoir and the corresponding ends of said tubular casing and said heating unit, a wiring conduit extending through said upper end of said reservoir and the corresponding end of said heating unit, and electric wires extending through said conduits and detachably connected at their ends to the adjacent ends of said resistance coil.

6. The combination set forth in claim 1 wherein said heating unit includes a core having an axial opening through which said outlet tube extends, an electric resistance coil mounted on said core, a wiring conduit extending through said lower end of said reservoir and the corresponding ends of said tubular casing and said heating unit, a wiring conduit extending through said upper end of said reservoir and the corresponding end of said heating unit, and electric wires extending through said conduits and detachably connected at their ends to the adjacent ends of said resistance coil, each of the detachable connections between the ends of said wires and coil comprising a spacing sleeve located within said heating unit between the corresponding ends thereof and said core, an annular connector in said sleeve, and a screw mounted in said connector for securing together said ends of said wire and coil.

7. An electric water heater comprising a closed cylindrical reservoir having an inlet at the lower end thereof, a cylindrical casing located in said reservoir concentric therewith and spaced from the side and both ends thereof, said cylindrical casing being closed at its lower end and open at its upper end, a cylindrical electric heating unit located in said tube concentric therewith and spaced therefrom to form a chamber at the closed lower end thereof and an annular conduit leading from said chamber and opening into said reservoir at said open upper end of said casing, and an outlet tube passing axially through said electric heating unit and opening at its lower end into said chamber and extending exteriorly of said reservoir at the upper end thereof.

8. The combination set forth in claim 7 wherein said heating unit includes a porcelain core enclosed therein and having an exterior helical groove and an axial opening through which said outlet tube extends, a helically coiled resistance wire mounted in said groove, an insulated wiring conduit extending through said lower end of said reservoir and the corresponding ends of said cylindrical casing and said heating unit, and an insulated wiring conduit extending through said upper end of said reservoir and the corresponding end of said cylindrical heating unit, and electric wires extending through said wiring conduits and detachably connected to the adjacent ends of said helical resistance coil.

9. The combination set forth in claim 8 wherein each of the detachable connections between the ends of said wires and coil comprises a spacing sleeve located within said heating unit between the corresponding ends thereof and said core, an annular connector in said sleeve, and a screw mounted in said connector for securing together said ends of said wire and coil.

10. The combination set forth in claim 7 wherein said heating unit includes a refractory non-metallic heat absorbing core enclosed therein and having an axial opening through which said outlet tube extends, and a resistance wire wound around said core.

FREDERICK GRAVES.

REFERENCES CITED

The following references are of record in the file of this patent:

UNITED STATES PATENTS

| Number | Name | Date |
|---|---|---|
| 1,174,443 | Quain | Mar. 7, 1916 |
| 1,653,672 | Shriner | Dec. 27, 1927 |
| 1,674,369 | McQuinn | June 19, 1928 |
| 2,081,206 | Parker | May 25, 1937 |